United States Patent
Kjær Larsen

(10) Patent No.: US 12,302,923 B2
(45) Date of Patent: May 20, 2025

(54) PRODUCTION FACILITY AND METHOD FOR CONTROL OF WEIGHT OF COATING MATERIAL ON AN ICE CREAM PRODUCT

(71) Applicant: GRAM EQUIPMENT A/S, Kolding (DK)

(72) Inventor: Jan Kjær Larsen, Sdr. Stenderup (DK)

(73) Assignee: GRAM EQUIPMENT A/S, Kolding (DK)

( * ) Notice: Subject to any disclaimer, the term of this patent is extended or adjusted under 35 U.S.C. 154(b) by 106 days.

(21) Appl. No.: 17/606,788

(22) PCT Filed: May 4, 2020

(86) PCT No.: PCT/DK2020/050129
§ 371 (c)(1),
(2) Date: Oct. 27, 2021

(87) PCT Pub. No.: WO2020/224736
PCT Pub. Date: Nov. 12, 2020

(65) Prior Publication Data
US 2022/0217993 A1    Jul. 14, 2022

(30) Foreign Application Priority Data

May 3, 2019    (DK) .............. PA 2019 70291

(51) Int. Cl.
*A23G 9/24*    (2006.01)
*A23G 3/24*    (2006.01)
(Continued)

(52) U.S. Cl.
CPC .............. *A23G 9/245* (2013.01); *A23G 3/24* (2013.01); *A23G 7/0012* (2013.01);
(Continued)

(58) Field of Classification Search
CPC ........ A23G 9/245; A23G 3/24; A23G 7/0012; A23G 7/0062; A23G 9/265; A23G 9/322; A23P 20/15
See application file for complete search history.

(56) References Cited

U.S. PATENT DOCUMENTS 3,566,613 A    3/1971 Kinney
3,648,741 A    3/1972 Croasdale et al.
(Continued)

FOREIGN PATENT DOCUMENTS

CA    1154850    10/1983
EP    2223607 A1    9/2010
(Continued)

OTHER PUBLICATIONS

TR-201900910-A2 (Clarivate machine translation) (Year: 2019).*
(Continued)

*Primary Examiner* — Elizabeth Gwartney
*Assistant Examiner* — Andrew E Merriam
(74) *Attorney, Agent, or Firm* — Schmeiser, Olsen & Watts, LLP

(57) ABSTRACT

In a production facility for coating ice cream products a plurality of carriers are used for transport of the ice cream products from the supply station to a coating station where coating, for example chocolate, is applied to the product. The production facility includes weight equipment configured for automatically weighing the ice cream products before and after application of the coating, which is used in a feedback loop for adjusting the coating parameters, for example chocolate temperature.

14 Claims, 4 Drawing Sheets

(51) Int. Cl.
- *A23G 7/00* (2006.01)
- *A23G 9/26* (2006.01)
- *A23G 9/32* (2006.01)
- *A23G 9/48* (2006.01)

(52) U.S. Cl.
CPC ........... *A23G 7/0062* (2013.01); *A23G 9/265* (2013.01); *A23G 9/322* (2013.01); *A23G 9/48* (2013.01); *A23G 2220/10* (2013.01)

(56) References Cited

U.S. PATENT DOCUMENTS

| | | | |
|---|---|---|---|
| 4,316,490 | A | 2/1982 | Meyer |
| 4,494,582 | A | 1/1985 | Meyer |
| 5,958,493 | A | 9/1999 | Grigoli |
| 6,209,590 | B1 | 4/2001 | Mandsberg |
| 10,889,444 | B2 * | 1/2021 | Nothum, Jr. ......... B65G 41/005 |
| 2002/0061349 | A1 * | 5/2002 | Banko ..................... A23G 3/26 426/306 |
| 2016/0044935 | A1 | 2/2016 | Aldred et al. |
| 2016/0316784 | A1 | 11/2016 | Chandrasekaran |

FOREIGN PATENT DOCUMENTS

| | | |
|---|---|---|
| GB | 301911 | 8/1929 |
| TR | 201900910 A2 * | 4/2019 |
| WO | 2010/072481 A1 | 7/2010 |

OTHER PUBLICATIONS

International Search Report for PCT/DK2020/050129 mailed Aug. 17, 2020.
Written Opinion for PCT/DK2020/050129 mailed Aug. 17, 2020.
International Preliminary Report on Patentability for PCT/DK2020/050129 mailed Apr. 12, 2021.
Danish Office Action (intention to grant) dated Sep. 24, 2019 for Application No. PA 2019 70291.

* cited by examiner

PRODUCTION FACILITY AND METHOD FOR CONTROL OF WEIGHT OF COATING MATERIAL ON AN ICE CREAM PRODUCT

CROSS-REFERENCE TO RELATED APPLICATIONS

This application claims priority to PCT Application No. PCT/DK2020/050129, having a filing date of May 4, 2020, which is based DK Application No. PA 2019 70291, having a filing date of May 3, 2019, the entire contents both of which are hereby incorporated by reference.

FIELD OF TECHNOLOGY

The following relates to a production facility and method for control of weight of coating material on an ice cream product that has an ice cream block on a stick. The production facility is of the type used for producing coated ice cream products and comprises a supply station for providing ice cream products and a plurality of carriers for transport of the ice cream products from the supply station to a coating station. The carriers are arranged one carrier after the other in a cyclic arrangement for pickup of new ice cream products for coating the ice cream products after a transport cycle. Each carrier comprises at least one clamp for holding a stick during transport to the coating station and during application of the coating to the ice cream block of the ice cream product.

BACKGROUND

A process for the production of coated ice cream product is disclosed in U.S. Pat. No. 5,958,493 by Gram Equipment A/S. The process includes extruding, cutting, stick insertion, cooling, coating, and packaging. The problem with weight of the ice cream product deviating from a target value is not considered in this patent.

However, when producing ice cream products, correct weight of the ice cream in the package is an important issue. On the one hand, if the container comprises too little ice cream, this is not acceptable by the end user and typically also not by the final seller. On the other hand, a minimum surplus of product in the package is of interest to the producer in order to maintain competitive prices. This, there is a general interest for providing ice cream products with a precise weight.

The US patents with numbers U.S. Pat. Nos. 3,566,613, 4,494,582, 4,316,490, and 6,209,590, and Canadian patent document CA1154850 disclose control weighing of ice cream containers, and an adjustment mechanism by a controller. For the case that the filling of ice cream into the containers is under a predetermined limit, U.S. Pat. No. 3,648,741 discloses a trim filler for adjustment of the final weight.

For ice cream products that are covered with chocolate, weight precision is even more important, as the costs for chocolate is by far higher than the costs of an equivalent amount of ice cream. In some cases, thick chocolate coatings are multiple times more expensive than the ice cream that is coated.

Typically, the coating by chocolate or alternatively jelly or fruit juice, is done by preparatory weighing in a series of experiments where ice cream products are inserted into the molten chocolate by varying the coating time. The correct formulation and temperature of the chocolate and the correct timing is then used for the production. Such procedures are explained in US patent applications numbered US2016/316784ad US2016/044935. Using a stream of air to remove the surplus of chocolate is disclosed in GB301911.

Although, the chocolate coating can be determined with high precision in the experiments, unfortunately, this does not prevent uncertainties during the final production, where deviations from the experimental values are typically observed.

Accordingly, there is a need for better control of the weight of the chocolate during coating of ice cream products in production.

SUMMARY

An aspect relates to more precise control of ice cream coating in production processes, especially chocolate coatings. This aspect is achieved by a method and apparatus for control of weight of coating material on an ice cream product in a production facility as described in the following.

The production facility comprises a supply station for providing ice cream products. For example, the production facility is of the general principle as disclosed in U.S. Pat. No. 5,958,493 by Gram Equipment A/S, comprising ice cream extrusion, cutting the extruded ice cream into blocks for an ice cream product, stick insertion into the cut block, cooling, coating, and packaging. Such production facilities are typically run at high speed, producing in excess of 10,000 ice cream products per hour, for example producing in the range of 36,000 ice cream products per hour.

The improvement concerns the coating process. In the production facility a plurality of carriers are used for transport of the ice cream products to a coating station where coating, for example chocolate, is applied to the ice cream block. The production facility comprises weight equipment configured for automatically weighing the ice cream products before and after application of the coating, which is used in a parameter feedback loop for adjusting the coating parameters, for example chocolate temperature, ice cream temperature and/or dipping time.

The production facility and the method for its operation are described in greater detail in the following.

In the production facility, multiple carriers are provided for transport of the ice cream products to a coating station. The carriers, for example in the form of bars holding a plurality of sticks of the ice cream product, are arranged as one carrier after the other in a cyclic arrangement. The carriers are used for pickup of new products by their sticks for transport to the coating station after a completed transport cycle, typically passing the packing station.

Each carrier comprising at least one clamp for holding one or a plurality of sticks, but typically comprises a plurality of clamps for holding one stick in each clamp, during transport to the coating station and during application of the coating to the ice cream block.

In some concrete embodiments, a bar is provided as part of the carrier with one bar for each carrier. In practical embodiments, each bar comprises multiple clamps arranged in a row for holding a corresponding row of individual sticks. The bar is arranged for dipping the row of ice cream products simultaneously into a liquid coating bath of the coating material, such as molten chocolate coating.

For determining a correct weight of the coating, the production facility comprises weight equipment that is configured for automatically weighing the ice cream products before and after application of the coating. For example, the weight equipment is connected to an electronic controller with a computer unit and configured for transmitting weight data for the weight measurements from the weight equipment to the controller. The controller is configured for receiving the weight data from the weight equipment repeatedly during production and configured for automatically comparing the weight of the coating of the ice cream stick to predetermined values.

Typically, the predetermined values comprise a minimum level for the weight. However, it is of interest to the producer not to overshoot this weight by a large surplus amount, as the additional chocolate is expensive for the producer and implies wasted profit. Therefore, in addition, the predetermined values comprise a margin within which the weight is advantageously contained.

For example, the coating is chocolate, and there is a requirement for at least 20 grams of chocolate on the ice cream bock, and the margin is set to 1 gram. This target can also be provided by an average weight of 20.5 grams with a margin of +/−0.5 grams.

The controller is configured for changing coating parameters for the coating procedure on the basis of the weight data from the weight equipment if the weight of the coating deviates from the predetermined values. In an embodiment, the production facility is configured for change of coating parameters by the controller during the running production and without a necessity of halting the production. In particular, the parameter adjustment on the basis of the weigh data is arranged as a feedback loop for repeated adjustment of the parameters on the basis of the weight data from the subsequent weight measurements.

In practice, the method comprises the following automated sequence. The ice cream products provided by the supply station are picked up at their sticks by the clamps of a plurality of carriers and transported to the coating station. Before or after this transport but before application of the coating, the ice cream products are weighed by the weight equipment. Then, the ice cream blocks of the ice cream products are coated while being held at their sticks in the clamps of the carrier. After application the coating material, the ice cream products are weighed again by the weight equipment. The increase in weight from before to after the coating expresses the weight of the coating material applied to the ice cream block.

The weighing is done with the same weight cell or with different weights cells. In either case, all weight cells are part of what is herein called the weight equipment.

The weight data from the two measurements are transmitted to the controller. The received weight data are processed by the controller, which compares the weight of the coating of the ice cream products to the predetermined values. If the weight of the coating deviates from the predetermined values and, thus, is outside predetermined margins, coating parameters for the coating procedure are adjusted.

For example, at least one of the following is done:
coating time is increased or decreased, for example spray application time or dwell time during dipping;
temperature of the ice cream product changed prior to coating;
if air blowers are used for blowing off coating from the ice cream stick, the air flow, speed, temperature, and/or time is changed;
if vibration is used, the time, vibration direction, and/or vibration amplitude is adjusted.

In the case of the coating being chocolate, for which the system is especially useful, typically the temperature of the chocolate is increased or decreased.

In some practical embodiments, the weight equipment comprises a weight cell for each clamp in at least one of the bars. Each weight cell is configured for measuring the weight of one individual ice cream product in the row of ice cream products before and after the coating procedure.

In other embodiments the weight equipment is provided for each bar, where each bar may have one or more clamps, i.e., be able to carry one or more sticks. In these situations, the weight registration will represent the aggregated weight of the ice cream products carried by the one or more clamps on each bar. Hence, in order to achieve the weight per ice cream product the weight shall be divided by the number of clamps. This weight indication will represent an average for each ice cream product carried by clamps on the same bar. It is therefore assumed that all ice cream products carried by a bar will be treated in the same manner.

As an alternative, the weight equipment comprises one weight cell for at least one of the bars, the weight cell being configured for measuring the total weight of the row of ice cream products before and after the coating procedure. In this case, the weight measurements yield an average weight for the coating on an ice cream block among the row of ice cream products.

After the pre-coating weighing, the ice cream products of the row of ice cream products are dipped simultaneously into the coating material and after coating pulled out of the coating material. Optionally, the fluid coating is allowed dripping off before the next weighing procedure. The weighing is done, once the coating is not any more dripping off the ice cream product after solidification.

In a further alternative embodiment the method is further improved wherein a bar is provided as part of the carrier; wherein each bar comprises multiple clamps arranged in a row for holding the sticks by that row, wherein the production facility is arranged for dipping of the blocks of the row of ice cream products simultaneously into a liquid coating bath of the coating material, wherein the weight equipment comprises a weight cell where a selection of the clamps are provided with individual weight cells whereas other clamps are not provided with weight cells for measuring the weight of each of the individual ice cream product in the row of ice cream products arranged in a clamp with a weight cell before and after the coating procedure;
wherein the method comprises
weighing each ice cream product in the clamps provided with weight cells before coating;
dipping the ice cream products of the row of ice cream products simultaneously into a liquid coating bath of the coating material, pulling the row of ice cream products out of the coating material;
weighing each ice cream product (2) in the clamps provided with weight cells after the coating.

With this arrangement of weighing cells on some of the clamps on a bar the number of weighing cells and associated vulnerable electronics etc. may be reduced. As the clamps are arranged relatively close together it is assumed that as an average the weight obtained from a couple of weighing cells distributed along the bar is representative for all ice cream products on that particular bar.

Depending on the setup, each ice cream product is weighed individually or as part of the row, optionally before or after transportation to the packing station.

Typically, there is no need for providing weight cells for each carrier. As the carriers are moving cyclic and return to the supply station and subsequently to the coating station, it is typically sufficient to provide only one carrier, for example with a single weight cell for an entire group of ice cream products or with a plurality of weight cells for measuring the weight of the individual ice cream products.

In an embodiment, in order to prevent overload of the weight cells and reduce early degradation, the production facility comprises a releasable coupling between the weight cell and the ice cream product and is configured for decoupling each ice cream product from the weight cell but still hold it by the carrier during the dipping into the coating material. In this case, the weight cell is only coupled to the ice cream product during the weighing procedure, for example individually as one of the plurality of weight cells or collectively as part of the row of weight cells coupled to a plurality of ice cream products.

For example, the weight cell is coupled to the ice cream product only after pickup from the supply station, for example just before the coating station, and decoupled again prior to the dipping. Optionally, the production facility is configured for decoupling each ice cream product from the weight cell during transportation of the ice cream products from the supply station to the coating station. Optionally, the weight cell is also decoupled from the ice cream product during transport from the coating station to the packing station.

In alternative embodiments, the weight equipment comprises at least one scale and a container or platform arranged for receiving the ice cream products on the container or platform and weighing the ice cream products with the scale while resting on the container or platform. The production facility is then programmed to release the ice cream products from the clamps onto the container or platform for weighing the ice cream product by the weight.

In practice, the ice cream products are received from the carrier onto the container or platform and weighed while the ice cream products are resting on the container or platform before the coating and while the ice cream products are free of the carrier. Then, the carrier is picking up the ice cream products from the platform after the weighing and dipping the ice cream products into the coating material and pulling the row of ice cream products again out of the coating material. After solidification of the coating, the ice cream products are again received by the container or platform from the carrier and weighed while on the container or platform and while the ice cream products are free of the carrier. After the weighing, the carrier is picking up the ice cream products from the platform and transporting the ice cream products to the packing station.

BRIEF DESCRIPTION

Some of the embodiments will be described in detail, with references to the following Figures, wherein like designations denote like members, wherein.

DETAILED DESCRIPTION

In the following, offset is taken in a production line in which ice cream products are transported to a coating station. An example of a production line is disclosed in U.S. Pat. No. 5,958,493 by Gram Equipment A/S, in which the process includes extruding, cutting, stick insertion, cooling, coating, and packaging.

Figure 1:
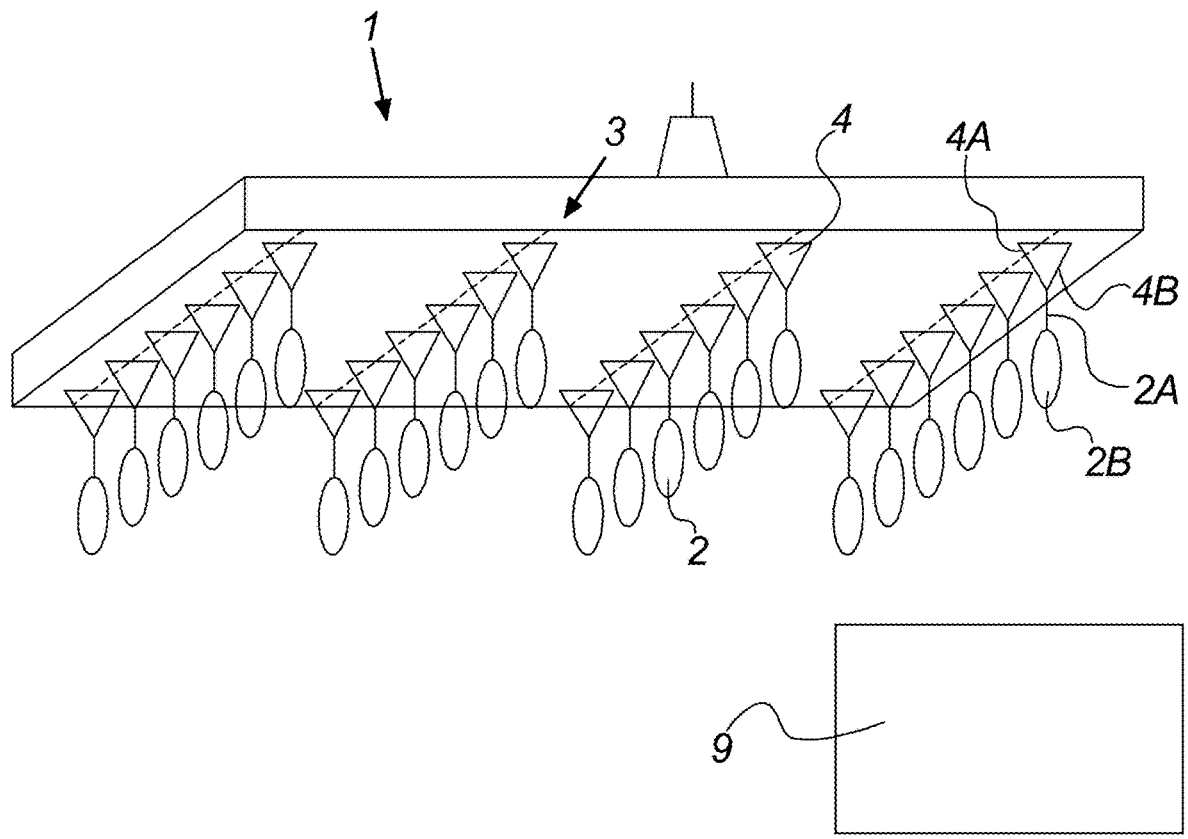
FIG. 1 shows a production line schematically in which a plurality of ice cream products are arranged in a row and carried on a bar, where the bars are provided on a frame in a cyclic arrangement.

FIG. 1 shows a section 1 of a production line in which a plurality of ice cream products 2 are arranged in a plurality of subsequent rows, each row carried by a bar 3 with a plurality of clamps 4 as holders for sticks 2A of the ice cream products 2.

Each of the stick holders 4 in the bar 3 comprises a releasable clamp 4 with two opposite arranged jaws 4A, 4B between which the stick 2 is clamped and held in vertical orientation. The bar 3 is transported pass a coating station 9 in the form of a bath of liquid coating material, in particular chocolate, into which the ice cream block 2B of the product 2 is inserted by lowering the bar 3. It is pointed out that the principle also applied for juice coating.

The thickness of the chocolate that remains on the ice cream block 2B depends on the viscosity of the chocolate fluid, the dipping time, the melting temperature of the chocolate, as well as the temperature of the ice cream. These parameters are typically adjusted before the start of the production line. However, it is pointed out that the chocolate pickup during the dipping process also changes the temperature of the chocolate bath, especially in the beginning of the production process or during changes in the production process. For this reason, it is advantageous to provide a feedback system for the weight of the pickup of the chocolate.

Figure 2:
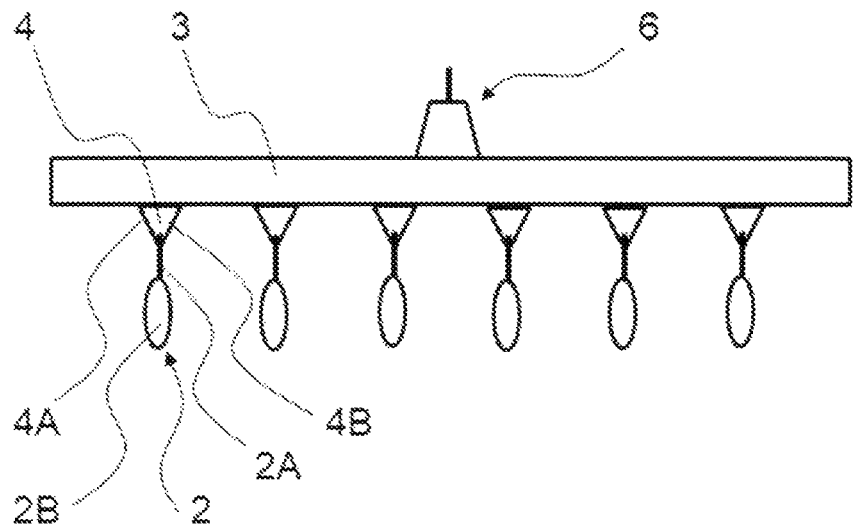
FIG. 2 illustrates a system in which a bar is provided with a weight cell which measures the weight of the bar.

FIG. 2 illustrates a system in which a bar 3 is provided with a weight cell 6 that measures the weight of the bar 3 before and after dipping the row of ice cream products 2. In this embodiment, the total chocolate pickup of the row of ice cream products 2 is measured, which by division of the number of sticks 2 of a row results in the average weight of the chocolate coating of a single ice cream product 2.

Figure 3:
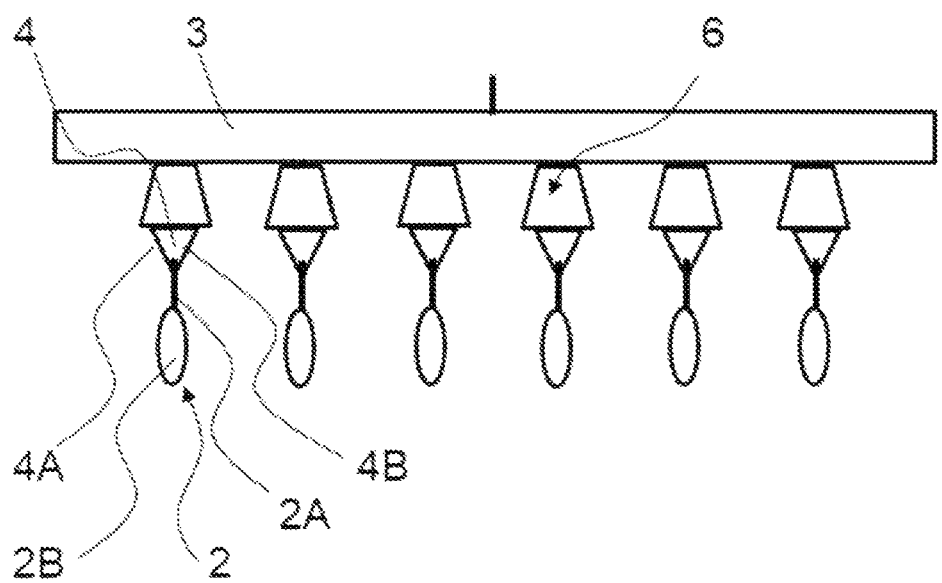
FIG. 3 illustrates an embodiment in which there is provided an individual weight cell for each clamp.

FIG. 3 illustrates an embodiment in which there is provided an individual weight cell 6 for each clamp 4. This arrangement yields in the actual weight increase for each individual product 2. The advantage over the system of FIG. 2 is increased precision with respect to statistical spread of the weight for ice cream products 2 that have undergone largely the same chocolate coating procedure.

Figure 4:
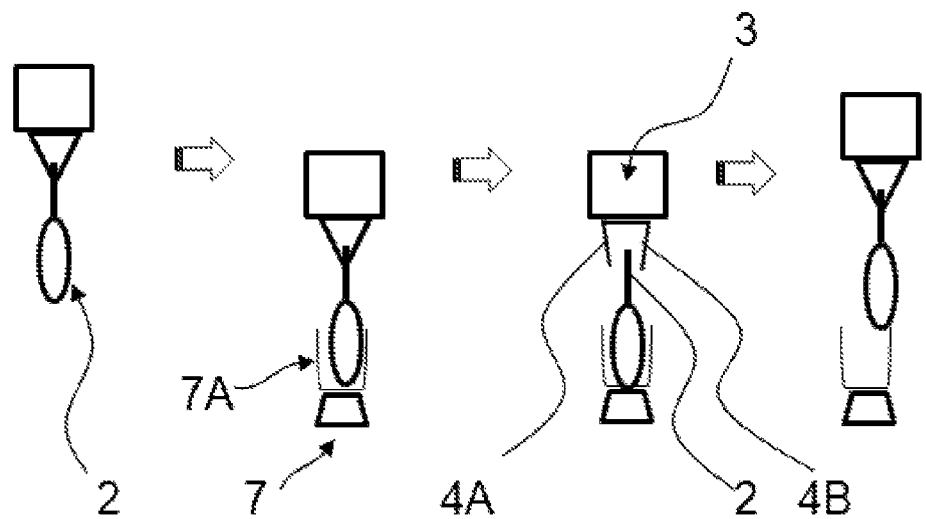
FIG. 4 illustrates a system in which ice cream products after solidification of a chocolate coating are dropped onto a scale and picked up again after the weighing.

FIG. 4 illustrates sequential weighing steps of a system in which the ice cream products 2 after solidification of the coating are dropped onto a weight 7 by releasing the sticks 2A from the clamp 4 by opening the jaws 4A, 4B for weighing by the weight 7. After the weighing, the ice cream products 2 are picked up again by their stick 2A. In order to hold the ice cream product 2, the container 7A is used on the weight.

Alternatively, but not illustrated here, the ice cream products 2 are dropped on the scale 7 and then not picked up again but transported from the scale 7 to the packing section by other transport means.

Figure 5:
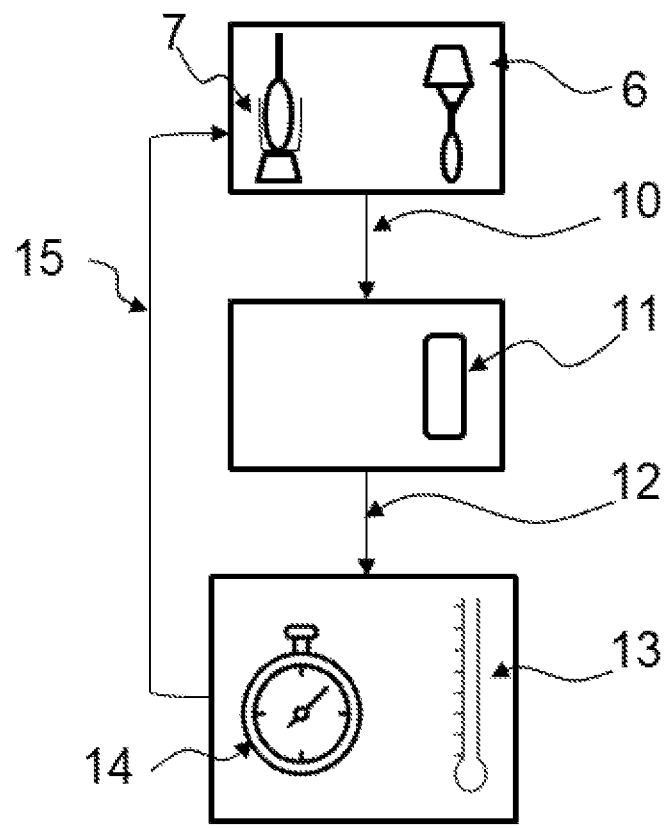
FIG. 5 illustrates a box diagram of a feedback loop system involving the weight cell and a controller as well as the coating station.

FIG. 5 is a box diagram 10 of a feedback system in which the signal from the scale 7 or weight cell 6 is transmitted 10 to a computerised controller 11, which calculates the deviation from the target value and computes 12 a possible change in the parameters of the chocolate coating, for example the temperature 13 and/or the pickup time 14 in which the product 2 remains in the chocolate bath, which is then used in a feedback loop 15 for the dipping time of the product of the cycle of the next product 2 batch.

In embodiments, where blowers are used to blow off the liquid chocolate from the surface of the ice cream, alternative parameter changes could relate to the blowing time and intensity of the air flow, thereby regulating the remaining chocolate on the stick.

In some embodiments, vibrators are used to shake of the chocolate, the vibration of which is optionally also regulated by the controller on the basis of the feedback of the weight.

In these cases, the weight control of the chocolate is used in a control feedback loop such that adjustment of the chocolate coating parameters is calculated and regulated during the production without halting the production. This has a special advantage in that deviations from a predetermined target pickup weight of the chocolate are adjusted and kept optimised under various conditions, for example from the start of the production or during changes of the production and until a steady state production cycle has been established.

Figure 6:
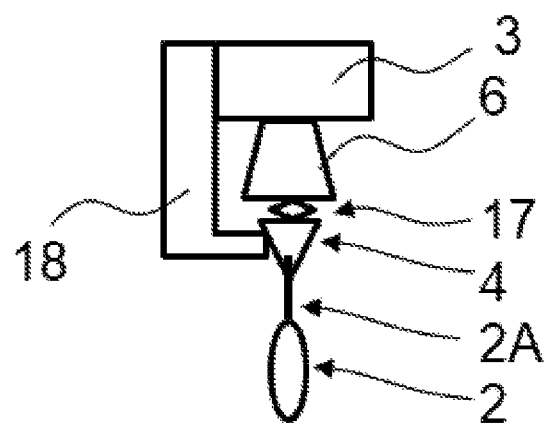
FIG. 6 illustrates a clamp 4 with a coupling 17.

FIG. 6 illustrates a clamp 4 with a coupling 17 that is shifted between held a regular holder 16 and a weight cell 6. The weight cell 6 is active only periodically for weighing the product 2 before and after the coating, but where the weight cell 6 is decoupled by the coupling 17 from the stick 2A of the product 2 during transport by the bar 3 in order to avoid overloading of the weight cell 6.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A method for control of weight of coating material on ice cream products in a production facility for coated ice cream products, wherein each coated ice cream product comprises an ice cream block on a stick; the production facility comprising a supply station for providing ice cream products and a plurality of carriers, for transport of a plurality of the ice cream products from the supply station to a coating station, wherein the carriers are arranged one carrier after another in a cyclic arrangement for pickup of a new ice cream product by the stick for coating after a transport cycle; each carrier comprising at least one clamp for holding the stick during transport of the ice cream product to the coating station and during application of the coating to the ice cream block; wherein the production facility comprises a weight equipment configured for automatically weighing the ice cream products before and after application of the coating, the weight equipment being connected to an electronic controller with a computer unit and configured for receiving weight data from a weight measurement by the weight equipment to the controller; wherein the controller is configured for receiving the weight data from the weight equipment repeatedly during production and for automatically comparing the weight of the coating of the ice cream products to at least one predetermined value and configured for changing one or more coating parameters for the coating procedure when the weight of the coating deviates from the at least one predetermined value; wherein the production facility is configured for change of one or more coating parameters by the controller during production and without a necessity of halting production; wherein parameter adjustment on the basis of the weight data is arranged as a feedback loop for repeatedly adjusting the parameters on the basis of the weight data from weight measurements of subsequent ice cream products;

wherein the method comprises in an automated process:
providing the ice cream products by the supply station and picking up the ice cream products by its stick via the at least one clamp and transporting the ice cream products to the coating station;
before coating, weighing the ice cream products;
coating the ice cream blocks while the ice cream sticks are held by the at least one clamp on the carrier;
weighing the ice cream products after application of the coating;
transmitting weight data from the weight measurements to the controller;
receiving the weight data from the weight measurement and comparing the weight of the coating of the ice cream products to at least one predetermined value and changing one or more coating parameters for the coating procedure when the weight of the coating deviates from the at least one predetermined value and using the changed one or more coating parameters in a feedback loop for subsequent coating;
wherein the steps of comparing, changing one or more coating parameters, and using the changed one or more coating parameters are effected during production and without halting production;
wherein a bar is provided as part of the carrier; the bar comprising multiple clamps arranged in a row for holding the stick of each individual ice cream product in that row, wherein the production facility is arranged for dipping of the ice cream blocks of the row of ice cream products simultaneously into a liquid coating bath of the coating material, wherein the weight equipment comprises a weight cell wherein a selection of the clamps is provided with individual weight cells whereas other clamps are not provided with weight cells for measuring the weight of each of the individual ice cream product having a clamp provided with a weight cell before and after the coating procedure;
wherein the automated process further comprises:
weighing each ice cream product in the clamp provided with the weight cell before coating;
dipping the ice cream products of the row of ice cream products simultaneously into the liquid coating bath of the coating material, pulling the row of ice cream products out of the coating material; and
weighing each ice cream product in the clamp provided with the weight cell after the coating.

2. The method according to claim 1, wherein the production facility is configured for decoupling the weight cells during transportation of the product from the supply station to the coating station, and wherein the method comprises: coupling the weight cells only after pickup from the supply station and decoupling the weight cells prior to the dipping.

3. The method according to claim 1, wherein the production facility is configured for decoupling each stick from the weight cells during transportation of the product from the supply station to the coating station, and wherein the method comprises: coupling the weight cells to the stick only after pickup from the supply station and decoupling the weight cell prior to the dipping.

4. The method according to claim 1, wherein the weight equipment comprises a scale and a container or platform arranged for receiving the ice cream products on the container or platform and weighing the ice cream products while the ice cream product rests on the container or platform; wherein the production facility is programmed to release the sticks of the ice cream products from the clamps for the purpose of placing the ice cream products onto the container or platform, wherein the method comprises:
- receiving the ice cream products from the carrier onto the container or platform;
- weighing the ice cream products on the container or platform before the coating while the stick is free of the carrier;
- with the carrier picking up the stick from the container or the platform after the weighing;
- dipping the ice cream block into the coating material and pulling a row of blocks out of the coating material;
- after coating, receiving the ice cream products from the carrier onto the container or platform;
- weighing the ice cream product on the container or platform with the scale after the coating while the ice cream product is free of the carrier;
- with the carrier picking up the ice cream product from the container or platform after the weighing; and
- and transporting the ice cream product to the packing station.

5. The method according to claim 1, wherein the coating material is chocolate and the method comprises adjusting the temperature of the chocolate as part of the feedback loop parameter adjustment in order to adjust the applied weight of the chocolate.

6. The method according to claim 1, wherein at least one of the following coating parameters are changed in response when the weight of the coating deviates from the predetermined values:
- temperature of the coating is adjusted;
- coating time is increased or decreased;
- temperature of the ice cream product is changed prior to coating;
- if air blowers are used for blowing off coating from the ice cream stick, the air flow, speed, temperature, and/or time is changed;
- if vibration is used, time, vibration direction, and/or vibration amplitude is adjusted.

7. The method according to claim 1, wherein weighing the ice cream products is done after transporting the ice cream products to the coating station.

8. A method for control of weight of coating material on ice cream products in a production facility for coated ice cream products, wherein each coated ice cream product comprises an ice cream block on a stick; the production facility comprising a supply station for providing ice cream products and a plurality of carriers, for transport of a plurality of the ice cream products from the supply station to a coating station, wherein the carriers are arranged one carrier after another in a cyclic arrangement for pickup of a new ice cream product by the stick for coating after a transport cycle; each carrier comprising at least one clamp for holding the stick during transport of the ice cream product to the coating station and during application of the coating to the ice cream block; wherein the production facility comprises a weight equipment configured for automatically weighing the ice cream products before and after application of the coating, the weight equipment being connected to an electronic controller with a computer unit and configured for receiving weight data from a weight measurement by the weight equipment to the controller; wherein the controller is configured for receiving the weight data from the weight equipment repeatedly during production and for automatically comparing the weight of the coating of the ice cream products to at least one predetermined value and configured for changing one or more coating parameters for the coating procedure when the weight of the coating deviates from the at least one predetermined value; wherein the production facility is configured for change of one or more coating parameters by the controller during production and without a necessity of halting production; wherein parameter adjustment on the basis of the weight data is arranged as a feedback loop for repeatedly adjusting the parameters on the basis of the weight data from weight measurements of subsequent ice cream products;
- wherein the method comprises in an automated process:
  - providing the ice cream products by the supply station and picking up the ice cream products by its stick via the at least one clamp and transporting the ice cream products to the coating station;
  - before coating, weighing the ice cream products;
  - coating the ice cream blocks while the ice cream sticks are held by the at least one clamp on the carrier;
  - weighing the ice cream products after application of the coating;
  - transmitting weight data from the weight measurements to the controller;
  - receiving the weight data from the weight measurement and comparing the weight of the coating of the ice cream products to at least one predetermined value and changing one or more coating parameters for the coating procedure when the weight of the coating deviates from the at least one predetermined value and using the changed one or more coating parameters in a feedback loop for subsequent coating;
- wherein the steps of comparing, changing one or more coating parameters, and using the changed one or more coating parameters are effected during production and without halting production;
- wherein a bar is provided as part of the carrier; the bar comprising multiple clamps arranged in a row for holding the stick of each of the ice cream products in that row, wherein the production facility is arranged for dipping the ice cream blocks of the row of ice cream products simultaneously into a liquid coating bath of the coating material, wherein the weight equipment comprises one weight cell for the bar, the weight cell being configured for measuring the total weight of the row of ice cream products before and after the coating procedure;
- wherein the method further comprises:
- weighing the ice cream products of the bar in common before the coating;
- dipping the blocks of the row of ice cream products simultaneously into the coating material, pulling the row of ice cream products out of the coating material; and
- weighing the ice cream products of the row of ice cream products in common after the coating.

9. The method according to claim 8, wherein the production facility is configured for decoupling the weight cells during transportation of the product from the supply station to the coating station, and wherein the method comprises:

coupling the weight cells only after pickup from the supply station and decoupling the weight cells prior to the dipping.

10. The method according to claim 8, wherein the production facility is configured for decoupling each stick from the weight cells during transportation of the product from the supply station to the coating station, and wherein the method comprises: coupling the weight cells to the stick only after pickup from the supply station and decoupling the weight cell prior to the dipping.

11. The method according to claim 8, wherein the weight equipment comprises a scale and a container or platform arranged for receiving the ice cream products on the container or platform and weighing the ice cream products while the ice cream product rests on the container or platform;

wherein the production facility is programmed to release the sticks of the ice cream products from the clamps for the purpose of placing the ice cream products onto the container or platform, wherein the method comprises:
   receiving the ice cream products from the carrier onto the container or platform;
   weighing the ice cream products on the container or platform before the coating while the stick is free of the carrier;
   with the carrier picking up the stick from the container or the platform after the weighing;
   dipping the ice cream block into the coating material and pulling a row of blocks out of the coating material;
   after coating, receiving the ice cream products from the carrier onto the container or platform;
   weighing the ice cream product on the container or platform with the scale after the coating while the ice cream product is free of the carrier;
   with the carrier picking up the ice cream product from the container or platform after the weighing; and
   and transporting the ice cream product to the packing station.

12. The method according to claim 8, wherein the coating material is chocolate and the method comprises adjusting the temperature of the chocolate as part of the feedback loop parameter adjustment in order to adjust the applied weight of the chocolate.

13. The method according to claim 8, wherein at least one of the following coating parameters are changed in response when the weight of the coating deviates from the predetermined values:
   temperature of the coating is adjusted;
   coating time is increased or decreased;
   temperature of the ice cream product is changed prior to coating;
   if air blowers are used for blowing off coating from the ice cream stick, the air flow, speed, temperature, and/or time is changed;
   if vibration is used, time, vibration direction, and/or vibration amplitude is adjusted.

14. The method according to claim 8, wherein weighing the ice cream products is done after transporting the ice cream products to the coating station.

\* \* \* \* \*